US012763360B2

(12) United States Patent
Gonzalez Malabet et al.

(10) Patent No.: US 12,763,360 B2
(45) Date of Patent: Oct. 13, 2026

(54) REMOVABLE BINDER FOR HOT-PRESSED SOLID-STATE ELECTROLYTE SEPARATORS

(71) Applicant: GM GLOBAL TECHNOLOGY OPERATIONS LLC, Detroit, MI (US)

(72) Inventors: Hernando Gonzalez Malabet, Farmington Hills, MI (US); Thomas A. Yersak, Royal Oak, MI (US); Aaron Ketchum, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 770 days.

(21) Appl. No.: 18/080,864

(22) Filed: Dec. 14, 2022

(65) Prior Publication Data

US 2024/0204242 A1 Jun. 20, 2024

(51) Int. Cl.

| | |
|---|---|
| ***H01M 10/0525*** | (2010.01) |
| ***H01M 10/052*** | (2010.01) |
| ***H01M 10/0562*** | (2010.01) |
| *H01M 4/02* | (2006.01) |

(52) U.S. Cl.

CPC ... *H01M 10/0562* (2013.01); *H01M 10/0525* (2013.01); *H01M 2004/027* (2013.01); *H01M 2300/0071* (2013.01)

(58) Field of Classification Search

None

See application file for complete search history.

(56) References Cited

U.S. PATENT DOCUMENTS

| | | | | |
|---|---|---|---|---|
| 2012/0115035 A1* | 5/2012 | Ota | ........................ | H01G 11/70 361/523 |
| 2019/0207252 A1* | 7/2019 | Badding | ............. | H01M 4/0471 |
| 2021/0050619 A1* | 2/2021 | Yersak | .................... | C03C 3/321 |
| 2021/0280842 A1* | 9/2021 | Shin | ...................... | H01M 4/364 |

* cited by examiner

*Primary Examiner* — Maria Laios

*Assistant Examiner* — Zachary Richard Cochenour

(74) *Attorney, Agent, or Firm* — Quinn IP Law

(57) ABSTRACT

A removable binder system to expand application of hot-pressed solid-state electrolyte separator technology is provided, specifically a solid-state electrolyte (SSE) for an electrochemical cell, a method for producing an electrochemical cell and an electrode composite film for an electrochemical cell in order to provide separators that work well with binders such that removing the binders does not affect the electro-molecular properties of the separators.

11 Claims, 3 Drawing Sheets

REMOVABLE BINDER FOR HOT-PRESSED SOLID-STATE ELECTROLYTE SEPARATORS

STATEMENT REGARDING FEDERALLY SPONSORED RESEARCH OR DEVELOPMENT

This invention was made with government support under contract number DE-EE0008857 awarded by the US Department of Energy. The government has certain rights in the invention.

INTRODUCTION

The present disclosure is related to design of a removable binder system to expand application of hot-pressed solid-state electrolyte separator technology.

Current separators do not work well with binders. Removing the binders affects the electro-molecular properties of the separators.

The present disclosure addresses the issue of current separators as related to binders by providing an improved green film.

SUMMARY

The present disclosure provides a solid-state electrolyte (SSE) for an electrochemical cell, a method for producing an electrochemical cell and an electrode composite film for an electrochemical cell. The SEE includes a separator film and a 1-10 wt. % removable binder holding the film together, where the SSE is a glass formed by a glass forming system and has a crystallization activation energy greater than 200 kJ/mol and a glass transition temperature (Tg) greater than 200° C.

The SSE may be an oxysulfide glass doped with 0-30 mol % lithium halide dopant (LiCl, LiBr, LiI) and having composition yLi2S·(100-y-x)P2S5·xP2O5, where y=70 to 80 mol % and x=0.5-10 mol % and the binder may be polypropylene carbonate (PPC). The SSE may a sulfide or oxysulfide glass formed by at least a glass forming system or an oxide forming system and having a Tg greater than 300° C. and the binder may be polyvinyl chloride (PVC).

The SSE may be a sulfide or oxysulfide formed by at least a glass forming system or an oxide forming system with a Tg greater than 120° C. and the binder may be polyoxymethylene (POM). The film may a green film such that it is unconsolidated or calendared at room temperature with a porosity of less than 40 volume %.

The film may be a standalone film that is 10-150 microns thick. The film may be 1-100 microns thick and supported by a substrate, and the substrate may be 1-1000 microns thick and comprise a composite electrode film, a metal foil, or a polymer film.

The method may include providing a solid-state electrolyte (SSE), where the SSE is a glass formed by a glass forming system and has a crystallization activation energy greater than 200 kJ/mol and a glass transition temperature (Tg) greater than 200° C. and the glass includes a separator film and a 1-10 wt. % removable binder holding the film together, the film fabricated by a hot-pressing process, and removing the binder from the film prior to the hot-pressing process by utilizing a pre-heat treatment.

The pre-heat treatment may produce less than 70 volume % devitrification of a glass solid-state electrolyte. The pre-heat treatment may take less than 20 minutes and leave less than 30 wt. % residue. The pre-heat treatment may include dissolving the binder by utilizing a solvent that has a polarity less than 0.3 as defined according to water such that the solvent does not react with the film.

Providing the solid-state electrolyte (SSE) may include a spray deposition process. The pre-heat treatment may not include utilizing a solvent. The film may be a green film such that it is unconsolidated or calendared at room temperature with a porosity of less than 40 volume %.

The film may be a standalone film that is 10-150 microns thick. A crystallization activation energy (Ea) of the SSE may be greater than 200 kJ/mol.

The electrode composite film includes active material, a conductive additive, an SSE, reinforcing fiber, and a removable binder, where the electrode composite film is an anode or a cathode. The electrode composite film may be an anode and the active material may be graphite, SiOx, Si, LTO or a mixture of at least two of SiOx, Si, and LTO.

The electrode composite film may be a cathode and the active material may be NCM, LMO, LFP, LMFP, Li Mn rich (LMR), FeS2, or S. The electrode composite film may include 30-70 wt. % active material, 70-30 wt. % SSE, 1-20 wt. % conductive additive and 1-10 wt. % reinforcing fiber.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed disclosure of illustrated embodiments and representative modes for carrying out the disclosure when taken in connection with the accompanying drawings and appended claims. Moreover, the present disclosure expressly includes combinations and sub-combinations of the elements and features presented previously and subsequently.

BRIEF DESCRIPTION OF THE DRAWINGS

FIG. 2(*b*) illustrates a possible implementation of crystallization according to temperature and time.

FIG. 3(*b*) illustrates crystallization according to the present disclosure.

Figure 1:
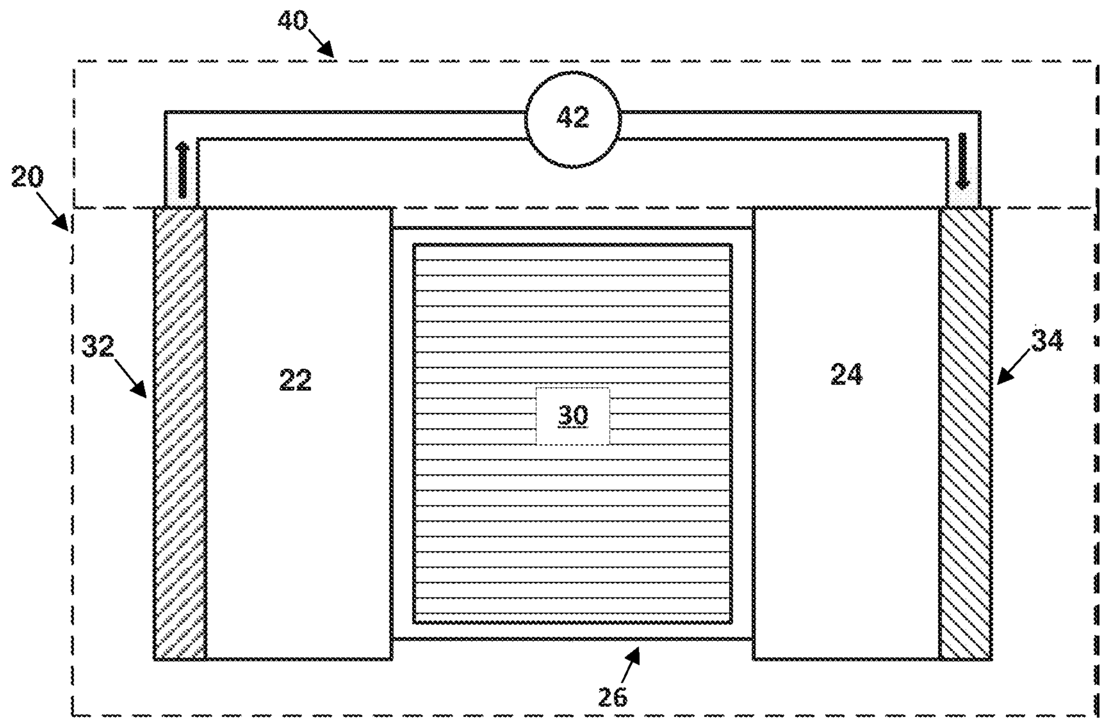
FIG. 1 illustrates a schematic view of a possible implementation of an electrochemical cell.

The present disclosure may be extended to modifications and alternative forms, with representative embodiments illustrated in the drawings and disclosed in detail herein. Inventive aspects of the present disclosure are not limited to the disclosed embodiments. Rather, the present disclosure is intended to cover modifications, equivalents, combinations, and alternatives falling within the scope of the disclosure as defined by the appended claims.

DETAILED DISCLOSURE

The following disclosure is merely exemplary in nature and is not intended to limit the present disclosure, application, or uses. It should also be understood that throughout the drawings, corresponding reference numerals indicate like or corresponding parts and features.

The present disclosure is susceptible of embodiment in many different forms. Representative examples of the disclosure are shown in the drawings and disclosed herein in detail as non-limiting examples of the disclosed principles. To that end, elements and limitations disclosed in the Abstract, Introduction, Summary, and Detailed Disclosure sections, but not explicitly set forth in the claims, should not be incorporated into the claims, singly or collectively, by implication, inference, or otherwise.

Example embodiments will now be disclosed more fully with reference to the accompanying drawings. The present disclosure relates generally to a design that includes metal, alloy and composite anodes such as lithium alloy-based electrodes, electrochemical cells including the lithium-alloy based electrodes, and methods for making the same. Specifically, the present disclosure is related to design of a removable binder system to expand application of hot-pressed solid-state electrolyte separator technology.

High-energy density electrochemical cells, such as lithium-ion (LI) batteries (LIBs) may be used in a variety of consumer products and vehicles, such as hybrid or electric vehicles. One factor potentially limiting wider acceptance and use of battery-powered vehicles is the potentially limited driving range, especially where charging stations are not yet as available as gas stations are. It is desirable to provide batteries capable of providing longer drive ranges and shorter charge times. Furthermore, battery-powered vehicles often are required to operate in extreme weather conditions, such as at low temperatures in winter weather.

It has been a challenge to find economical battery chemistries that meet both energy and power requirements. There is a need for a battery having a chemistry that avoids or minimizes use of expensive metals, such as cobalt and other noble metals, while providing advantageous power delivery, long driving ranges, and fast charging to enhance widespread use of batteries, especially in vehicles.

The present disclosure is related to rechargeable LIBs, which may be used in vehicle applications. However, the present disclosure may also be used in other electrochemical devices, such as handheld electronic devices. A rechargeable LIB is provided that exhibits high energy density, low-capacity fade, and high Coulombic efficiency.

A typical electrochemical cell may include a first electrode, such as a positive electrode or cathode, a second electrode such as a negative electrode or an anode, an electrolyte, and a separator. Often, electrochemical cells in a LIB pack are electrically connected in a stack to increase overall output. LI electrochemical cells operate by reversibly passing LIs between the negative electrode and the positive electrode. The separator and the electrolyte may be between the negative and positive electrodes. The electrolyte should be suitable for conducting LIs and may be in liquid, gel, or solid form. Us move from a positive electrode to a negative electrode during charging of the battery, and in the opposite direction when discharging the battery.

Each of the negative and positive electrodes within a stack is typically electrically connected to a current collector, such as copper for the negative electrode and aluminum for the positive electrode. During battery usage, the current collectors associated with the two electrodes may be connected by an external circuit that allows current generated by electrons to pass between the negative and positive electrodes to compensate for transport of Us.

Electrodes may generally be incorporated into various commercial battery designs, such as prismatic shaped cells, wound cylindrical cells, coin cells, pouch cells, or other suitable cell shapes. The cells may include a single electrode structure of each polarity or a stacked structure with a plurality of positive electrodes and negative electrodes assembled in parallel and/or series electrical connections. Specifically, the battery may include a stack of alternating positive electrodes and negative electrodes with separators disposed therebetween. While the positive electroactive materials may be used in batteries for primary or single charge use, the resulting batteries generally have desirable cycling properties for secondary battery use over multiple cycling of the cells.

FIG. 1 illustrates a schematic view of a possible implementation of an electrochemical cell. As illustrated in FIG. 1, the electrochemical cell or LIB 20 includes a negative electrode 22, a positive electrode 24, and a porous separator 26, such as a microporous or nanoporous polymeric separator, between the negative electrode 22 and positive electrode 24. An electrolyte 30 is between the negative 22 and positive 24 electrodes and in pores of the porous separator 26. The electrolyte 30 may also be present in the negative electrode 22 and positive electrode 24, such as in pores.

A negative electrode current collector 32 may be at or near the negative electrode 22. A positive electrode current collector 34 may be at or near the positive electrode 24. Each of the negative electrode current collector 32 and positive electrode current collector 34 collect and move free electrons to and from an interruptible external circuit 40. The external circuit 40 includes a load device 42 that connects the negative electrode 22 via the negative electrode current collector 32 and connects the positive electrode 24 via the positive electrode current collector 34.

The porous separator 26 operates as both an electrical insulator and a mechanical support. Specifically, the porous separator 26 is between the negative electrode 22 and the positive electrode 24 and prevents or reduces physical contact and the occurrence of a short circuit. The porous separator 26, in addition to providing a physical barrier between the negative electrode 22 and the positive electrode 24, may provide a minimal resistance path for internal passage of Us (and related anions) during cycling of the Us to facilitate functioning of the LIB 20.

The LIB 20 may generate an electric current during discharge via reversible electrochemical reactions that occur when the external circuit 40 is closed to electrically connect the negative electrode 22 and the positive electrode 24 when the negative electrode 22 contains a relatively greater quantity of cyclable lithium. The chemical potential difference between the positive electrode 24 and the negative electrode 22 drives electrons produced by the oxidation of lithium, such as intercalated/alloyed/plated lithium, at the negative electrode 22 via the external circuit 40 toward the positive electrode 24. Us, which are also produced at the negative electrode 22, are concurrently transferred through the electrolyte 30 and porous separator 26 towards the positive electrode 24. The electrons flow through the external circuit 40 and the Us migrate across the porous separator 26 in the electrolyte 30 to intercalate/alloy/plate into a positive electroactive material of the positive electrode 24. The electric current passing through the external circuit 40 may be harnessed and directed through the load device 42 until the lithium in the negative electrode 22 is depleted and the capacity of the LIB 20 is diminished.

The LIB 20 may be charged or re-energized by connecting an external power source, such as a charging device, to the LIB 20 in order to reverse the electrochemical reactions that occur during battery discharge. The connection of an external power source to the LIB 20 causes the Us at the positive electrode 24 to move back toward the negative electrode 22. The electrons, which flow back towards the negative electrode 22 through the external circuit 40, and the Us, which are carried by the electrolyte 30 across the separator 26 back towards the negative electrode 22, reunite at the negative electrode 22 and replenish the negative electrode 22 with lithium for consumption during the next battery discharge cycle. Each discharge and charge event is considered a cycle, where Us are cycled between the positive electrode 24 and negative electrode 22.

In many LIB configurations, each of the negative electrode current collector 32, the negative electrode 22, the separator 26, the positive electrode 24, and the positive electrode current collector 34 are relatively thin layers having a thickness from several microns to a millimeter or less and assembled in layers connected in an electrical series and/or parallel arrangement to provide a suitable electrical energy and power package. The LIB 20 may include a variety of other components (not illustrated). The other components may be a casing, gaskets, terminal caps, tabs, battery terminals, and other components or materials that may be included within the LIB 20, such as between or around the negative electrode 22, the positive electrode 24, and/or the separator 26. The LIB 20 may also be connected in series or parallel with other similar LI cells or batteries in order to produce a greater voltage output, energy, and/or power as required by the load device 42.

The LIB 20 may generate electric current to the load device 42, which may be operatively connected to the external circuit 40. The load device 42 may also be a power-generating apparatus that charges the LIB 20 to store energy. The electrochemical cell may be a supercapacitor, such as a lithium-ion based supercapacitor.

The porous separator 26 and the electrolyte 30 may be replaced with a solid-state electrolyte (SSE) that functions as both an electrolyte and a separator. The SSE may be between the positive electrode 24 and the negative electrode 22. The SSE facilitates transfer of Us, while mechanically separating and providing electrical insulation between the negative electrode 22 and the positive electrode 24.

The positive electrode 24 may be formed from (or include) a lithium-based active material that may undergo lithium intercalation and deintercalation, alloying and dealloying, or plating and stripping, while functioning as the positive terminal of the LIB 20. The positive electrode 24 may include a positive electroactive material.

The positive electroactive material may be powder compositions. The positive electroactive material may be intermingled with an optional electrically conductive material, such as electrically-conductive particles, and a polymeric binder. The binder may both hold the positive electroactive material together and provide ionic conductivity to the positive electrode 24.

The negative electrode 22 may include a negative electroactive material as a lithium host material capable of functioning as a negative terminal of the LIB 20. The negative electrode 22 may be a lithium metal electrode (LME). The LIB 20 may be a lithium-metal battery or cell. The negative electrode 22 may optionally include an electrically conductive material, as well as one or more polymeric binder materials, to structurally hold the lithium material together.

The negative electrode 22 and positive electrode 24 are generally associated with the corresponding negative electrode current collector 32 and positive electrode current collector 34 to facilitate the flow of electrons between the corresponding electrode and the external circuit 40. The negative electrode current collector 32 and positive electrode current collector 34 are electrically conductive and may include metal, such as a metal foil, a metal grid or screen, or an expanded metal.

The positive electrode current collector 34 may be formed from aluminum or other appropriate electrically conductive material. The negative electrode current collector 32 may be formed from copper or other appropriate electrically conductive material.

Sulfide and oxy-sulfide glasses are formed by combining at least two types of materials, such as one or more glass formers and one or more glass modifiers. The glass former and the glass modifier may be collectively referred to as a glass forming system. When two glass formers are used, they may be referred to as a glass former and a glass co-former. The sulfide or oxy-sulfide glass formation may optionally include combining a dopant with the glass former(s) and glass modifier(s).

For a sulfide glass, both the glass former and the glass modifier include sulfur. An oxy-sulfide glass may include an oxide forming system with a sulfide co-former, a sulfide forming system with an oxide co-former, a sulfide forming system with an oxide co-modifier, or an oxide forming system with a sulfide co-modifier. The oxide forming system may be an oxide-containing glass former and an oxide-containing glass modifier. The sulfide forming system may be a sulfide-containing glass former and a sulfide-containing glass modifier.

The glass former and glass co-former may each include a glass-forming sulfide or oxide. Examples of glass forming sulfides include P2S5, SnS2, GeS2, B2S3, SiS2, and combinations thereof. Examples of glass forming sulfides or glass-forming oxides include SiO2, GeO2, P2O5, B2O3, Al2O3, and combinations thereof.

The glass modifier and glass co-modifier may each also include a sulfide or oxide. Examples of sulfide-containing glass modifiers include Li2S, Na2S, and combinations thereof. Examples of oxide-containing glass modifiers include Li2O, Na2O, and combinations thereof.

For use in batteries with lithium-containing negative electrodes, the glass modifier may include lithium, such as Li2S or Li2O. For use in batteries with sodium-containing negative electrodes, the glass modifier may include sodium, such as Na2S or Na2O.

To support advantageous electrolytic activity, at least the glass former or the glass modifier may contain sulfur. The dopant may be used to improve glass formability, ionic conductivity, and/or stability. For example, LiI may be added as a dopant to increase LI conductivity by increasing the amount of free LIs in the network. The dopant includes LiI, Li3PO4, Li4SiO4, LiCl, and combinations thereof.

The glass former(s) and the glass modifier(s) react to form a sulfide or oxy-sulfide glass that enables the formation of mobile alkali metal cations. For convenience, the sulfide and oxy-sulfide glass compositions are disclosed in terms of the atomic proportions of their glass forming system constituents. However, when reacted, the glass former(s) and the glass modifier(s) form glasses having anchored tetrahedral anions with mobile Lis or sodium ions.

For example, a glass that is formed from 70 mole percent Li2S glass modifier and 30 mole percent P2S5 glass former may be 70Li2S-30P2S5, and have composition Li7P3S11 when formed. The glass may include anchored phosphorus sulfide tetrahedral anion structural units (Ps/−) and mobile Us (Li+).

As used herein, formulas representing atomic proportion of constituents, such as 70Li2S-30P2S5, are referred to as "empirical formulas," even though they may be further simplified, such as Li7P3S11. The empirical formulas provide relative proportions of atoms, but not arrangement of atoms and may not provide quantity of atoms.

Figure 2A:
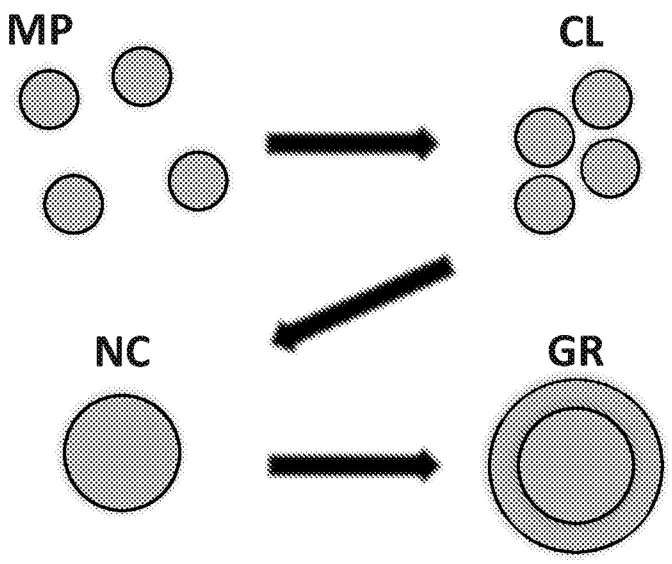
FIG. 2(*a*) illustrates a possible implementation of a crystallization process.
Figure 2B:
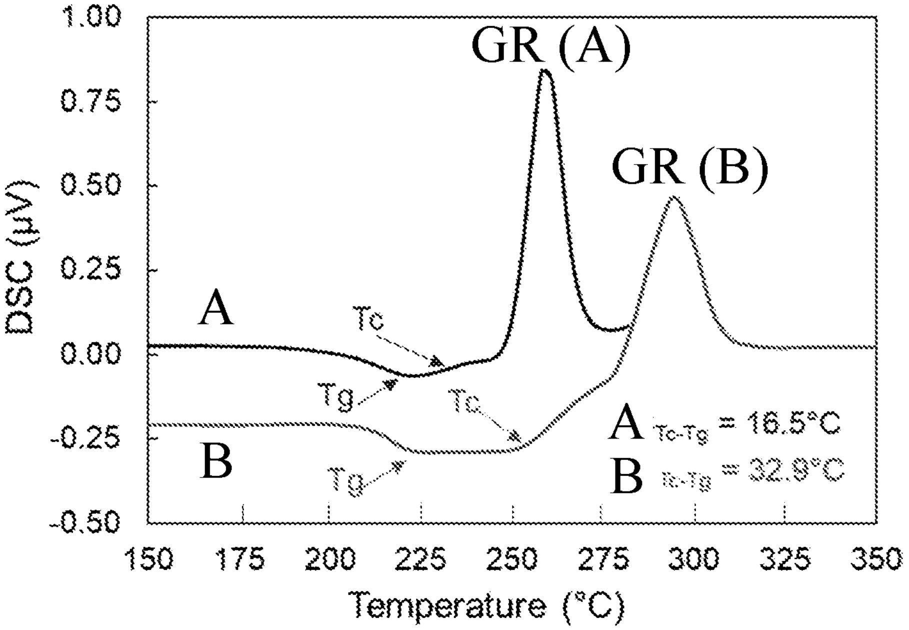

FIG. 2(*a*) illustrates a possible implementation of a crystallization process. FIG. 2(*b*) illustrates a possible implementation of crystallization according to temperature and time.

As illustrated in FIG. 2(*a*), crystallization occurs when glass materials transform into ceramic. Material particles (MP) cluster (CL) and nucleate (NC) together to later grow (GR) to produce a crystalline structure. This process initiates when the MP reach their glass transition temperature (Tg) and ends when the MP reach their crystallization temperature (Tc). As illustrated in FIG. 2(*b*), a higher Tc-Tg range results in slower crystallization and a longer time before crystallization, with graph B having a higher Tc-Tg range, a slower crystallization and a later crystallization than graph A having a lower Tc-Tg range.

Oxygen acts like a buffer that increases the crystallization time. The energy required to activate the crystallization process is referred to as crystallization activation energy (Ea). For faster crystallization times, the NC and GR occur simultaneously, and the Ea is linear. For longer crystallization times the NC and GR are non-simultaneous, the Ea is non-linear.

Current systems produce a linear Ea. The Kissinger model, used for linear Ea, is the simplest method to calculate and analyze Ea based on linear equations (Arrhenius) and yields a constant value, which will initiate faster crystallization.

The system according to the present disclosure produces non-linear Ea. The Avrami model, used for a non-linear Ea, is a complex method to calculate and analyze Ea based on partial differential equations and the lowest calculated Ea value will initiate a slower crystallization process.

Figure 3A:
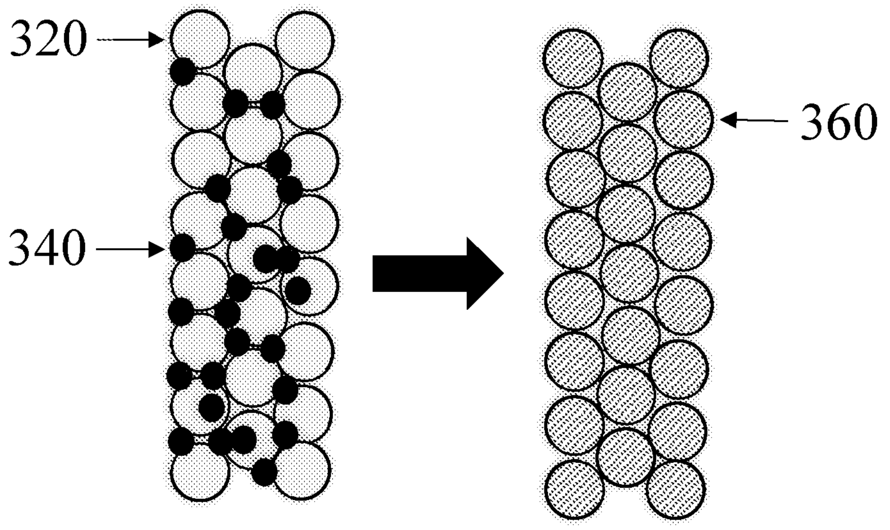
FIG. 3(*a*) illustrates a possible implementation of crystallization.
Figure 3B:
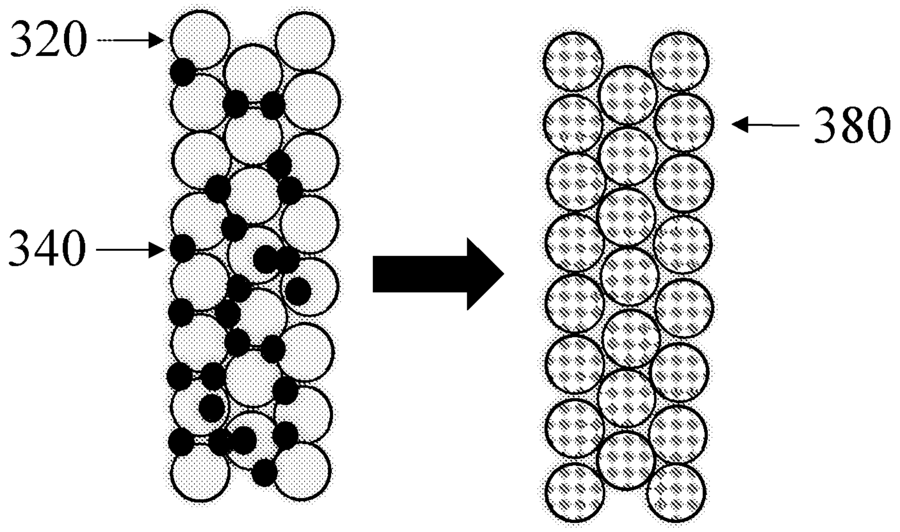

FIG. 3(*a*) illustrates a possible implementation of crystallization. FIG. 3(*b*) illustrates crystallization according to the present disclosure.

As illustrated in FIG. 3(*a*), the solid-state electrolyte 320 of the possible implementation does not remain glassy after removal of the binder 340 and results in a crystallized ceramic solid-state electrolyte 360 that cannot be processed effectively. As illustrated in FIG. 3(*b*), the solid-state electrolyte 320 of the present disclosure remains glassy after removal of the binder 340 and results in a crystallized ceramic solid-state electrolyte 380 that can be processed effectively.

Impermeable solid-state electrolyte separators have been developed, which are fabricated by hot pressing by which the glass electrolyte is softened by heating above its glass transition temperature, generally 200-350° C. depending upon glass composition. To increase throughput, green SSE films should be handled prior to the hot pressing. Therefore, the film requires a binder. However, current separators do not work well with current binders, which are not compatible with the hot-pressing process, and current binders are not compatible with hot pressing since they will melt and flow between SSE particles and increase impedance.

The binder used to hold the film together should be removed prior to hot pressing. Although the binder may be removed using a pre-heat treatment, the binder removal process should not affect glass SSE processability. The pre-heat treatment may cause the glass SSE to crystallize, which increases viscosity and makes the glass more difficult to hot press. The present disclosure provides a removable binder/SSE system that does not affect the processability of the SSE.

According to one of more embodiments of the present disclosure, a solid-state electrolyte (SSE) includes a separator film and a 1-10 wt. % binder. The SSE may be a glass with a glass transition temperature greater than approximately 200° C. The SSE Ea may be greater than approximately 200 kJ/mol. The SSE may be provided by a spray deposition process.

The binder may be polypropylene carbonate (PPC) and the SSE may be an oxysulfide glass with composition yLi2S·(100-y-x)P2S5·xP2O5 where (y=70 to 80 mol %; x=1-10 mol %) with the oxysulfide glass optionally doped with approximately 0-30 mol % lithium halide dopant (LiCl, LiBr, LiI). The binder may be polyvinyl chloride (PVC) and the SSE may be sulfide or oxysulfide glass with a Tg greater than approximately 300° C. The binder may be polyoxymethylene (POM) and the SSE may be sulfide or oxysulfide glass with a Tg greater than approximately 120° C.

The sulfide may be 70Li2S-30P2S5 or 75Li2S-25P2S5 with Tg of approximately 220° C., and Ea of approximately 150 kJ/mol when the binder is POM. The oxysulfide may be 70Li2S-25P2S5-5P2O5) with Tg of approximately 220° C., and Ea of approximately 250 kJ/mol when the binder is PPC or POM). The Tg is approximately 20° C. greater than the removal temperature of binder when the binder is POM or PVC.

According to the present disclosure, the SSE separator film is green such that it is unconsolidated or calendared at room temperature with a porosity of less than approximately 20 volume %. The SSE separator film may be a standalone film and approximately 10-150 microns thick.

The SSE separator film may be supported by a substrate, such as a composite cathode film, a composite electrode film, a metal foil, or a polymer film, and be approximately 1-1000 microns thick. The substrate may be approximately 1-100 microns thick.

A binder removal process according to the present disclosure will result in less than approximately 70 volume % devitrification of the (oxy)sulfide glass solid-state electrolyte, should take less than approximately 20 minutes to complete and should leave less than approximately 30 wt. % residue. The time of the process effects the process line speed, such that the longer the time, the slower the line speed, where slower line speeds equate to higher capital cost.

If a solvent is used to dissolve the binder, the solvent should not react with the SSE, such that ionic conductivity of the SSE does not degrade more than approximately 90% after immersion in the solvent. The solvent in one or more embodiments of the present disclosure should have a polarity less than approximately 0.3 as defined according to water.

An electrode composite film according to the present disclosure includes an active material, a conductive additive, an SSE, reinforcement, and a removable binder. The electrode composite film may be an anode or a cathode.

If the electrode composite film is an anode, the active material may be graphite, SiOx, Si, LTO or a mixture thereof. If the electrode composite film is a cathode, the active material may be NCM, LMO, LFP, LMFP, Li Mn rich (LMR), FeS2, or S.

The conductive additive may be carbon black, SWCNT, MWCNT, graphene or a mixture thereof. The electrode composite film may be approximately 30-70 wt. % active material, approximately 70-30 wt. % SSE, approximately 1-20 wt. % conductive additive and approximately 1-10 wt. % reinforcing fiber.

Benefits of the present disclosure include an improved green film, a slower crystallization process and corresponding later crystallization, and a removable binder/SSE system that does not affect the processability of the SSE as well as an improved binder removal process.

The detailed disclosure and the drawings are supportive and descriptive of the present disclosure, but the scope of the present disclosure is defined solely by the appended claims. While some of the best modes and other embodiments for carrying out the present disclosure have been disclosed in detail, various alternative designs and embodiments exist for practicing the present disclosure as recited in the appended claims. Moreover, the present disclosure expressly includes combinations and sub-combinations of the elements and features disclosed herein.

Aspects of the present disclosure have been presented in general terms and in detail with reference to the illustrated embodiments. Various modifications may be made by those skilled in the art without departing from the scope and spirit of the disclosed embodiments. One skilled in the relevant art will also recognize that the disclosed methods and supporting hardware implementations may be alternatively embodied in other specific forms without departing from the scope of the present disclosure. Therefore, the present disclosure is intended to be illustrative without limiting the inventive scope defined solely by the appended claims.

For purposes of the present disclosure, unless specifically disclaimed, use of the singular includes the plural and vice versa, the terms "and" and "or" shall be both conjunctive and disjunctive, and the words "including", "containing", "comprising", "having", and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As used herein, a component that is "configured to" perform a specified function is capable of performing the specified function without alteration, rather than merely having potential to perform the specified function after further modification. In other words, the disclosed hardware, when expressly configured to perform the specified function, is specifically selected, created, implemented, utilized, programmed, and/or designed for the purpose of performing the specified function.

The terminology used herein is for the purpose of disclosing particular example embodiments and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof.

Although the open-ended term "comprising," is to be understood as a non-restrictive term used to disclose and claim various embodiments set forth herein, in certain aspects, the term may alternatively be understood to instead be a more limiting and restrictive term, such as "consisting of" or "consisting essentially of" Thus, for a given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps.

In the case of "consisting of," the alternative embodiment excludes additional compositions, materials, components, elements, features, integers, operations, and/or process steps, while in the case of "consisting essentially of," additional compositions, materials, components, elements, features, integers, operations, and/or process steps that materially affect the basic and novel characteristics are excluded from such an embodiment, but compositions, materials, components, elements, features, integers, operations, and/or process steps that do not materially affect the basic and novel characteristics may be included in the embodiment.

Method steps, processes, and operations disclosed herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to disclose the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to disclose various steps, elements, components, regions, layers and/or sections, these steps, elements, components, regions, layers and/or sections should not be limited by these terms, unless otherwise indicated. These terms may be used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section disclosed herein could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein to disclose one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed disclosure, numerical values of parameters (e.g., of quantities or conditions) in this specification, including the appended claims, are to be understood as being modified by the term "about" or "approximately" regardless of whether "about" or "approximately" actually appears before the numerical value. In addition, disclosure of ranges includes disclosure of values and further divided ranges within the entire range, including endpoints and sub-ranges given for the ranges.

The word "about" or "approximately" indicates that the stated numerical value allows some slight imprecision (with some approach to exactness in the value; approximately or reasonably close to the value; nearly). If the imprecision provided by "about" or "approximately" is not otherwise understood in the art with this ordinary meaning, then "about" or "approximately" as used herein indicates at least variations that may arise from ordinary methods of measuring and using such parameters. For example, "about" or "approximately" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

What is claimed is:

1. A method for producing an electrochemical cell, the method comprising:

providing a solid-state electrolyte (SSE) having a separator film, the SSE a glass formed by a glass forming system and has a crystallization activation energy greater than 200 kJ/mol and a glass transition temperature (Tg) greater than 200° C. and comprising a green separator film and a 1-10 wt. % removable binder holding the green film together, the separator film fabricated from the green separator film by a hot-pressing process; and removing the binder from the green film prior to the hot-pressing process by utilizing a pre-heat treatment;

wherein a solvent is not utilized prior to the pre-heat treatment.

2. The method of claim 1, wherein the pre-heat treatment produces less than 70 volume % devitrification of a glass solid-state electrolyte.

3. The method of claim 1, wherein the pre-heat treatment takes less than 20 minutes.

4. The method of claim 1, wherein the pre-heat treatment leaves less than 30 wt. % residue.

5. The method of claim 1, wherein:

providing the solid-state electrolyte (SSE) comprises a spray deposition process.

6. The method of claim 1, wherein the green film is unconsolidated or calendared at room temperature with a porosity of less than 40 volume %.

7. The method of claim 1, wherein the film is a standalone film that is 10-150 microns thick.

8. The method of claim 1, wherein an Ea of the SSE is greater than 200 kJ/mol.

9. The method of claim 1, wherein:

the SSE is an oxysulfide glass doped with 0-30 mol % lithium halide dopant (LiCl, LiBr, LiI) and having composition $yLi_2S\cdot(100-y-x)P_2S_5\cdot xP_2O_5$, where y=70 to 80 mol % and x=0.5-10 mol %; and the binder is polypropylene carbonate (PPC).

10. The method of claim 1, wherein:

the SSE is a sulfide or oxysulfide glass formed by at least one of a glass forming system and an oxide forming system and having a Tg greater than 300° C.; and the binder is polyvinyl chloride (PVC).

11. The method of claim 1, wherein:

the SSE is a sulfide or oxysulfide formed at least one of a glass forming system and an oxide forming system and having a Tg greater than 120° C.; and the binder is polyoxymethylene (POM).

* * * * *